United States Patent [19]

Sansone

[11] 3,869,599

[45] Mar. 4, 1975

[54] OPTICAL PEN FOR HAND SCANNING DIGITALLY ENCODED RECORDS

[75] Inventor: Ronald P. Sansone, Floral Park, N.Y.

[73] Assignee: Pitney-Bowes, Inc., Stamford, Conn.

[22] Filed: Aug. 27, 1973

[21] Appl. No.: 391,618

[52] U.S. Cl. .... 235/61.11 E, 250/568, 340/146.3 Z
[51] Int. Cl. ... G06k 7/14, G06k 19/06, G01n 21/30
[58] Field of Search 235/61.11 E, 61.11 D, 61.12 N, 235/61.12 R, 61.11 R, 61.7 B; 340/146.3 SY, 146.3 Z, 149 A; 250/568, 569, 570

[56] References Cited

UNITED STATES PATENTS

| | | | |
|---|---|---|---|
| 3,533,657 | 10/1970 | DaSilva | 235/61.11 E |
| 3,665,164 | 5/1972 | Beveridge | 235/61.11 E |
| 3,671,722 | 6/1972 | Christie | 235/61.12 N |
| 3,744,025 | 7/1973 | Bilgutay | 340/146.3 Z |
| 3,784,794 | 1/1974 | Allais | 235/61.11 E |

*Primary Examiner*—Daryl W. Cook
*Assistant Examiner*—Robert M. Kilgore
*Attorney, Agent, or Firm*—William D. Soltow, Jr.; Albert W. Scribner; Peter Vrahotes

[57] ABSTRACT

An optical pen for reading coded records. The pen has a spherical lens at the tip thereof which lens serves as both focusing means and contacting means between the pen and the record. The tip of the pen is removable and may be replaced inexpensively and conveniently in case of damage.

18 Claims, 5 Drawing Figures

OPTICAL PEN FOR HAND SCANNING DIGITALLY ENCODED RECORDS

BACKGROUND OF THE INVENTION

There are many sensing systems proposed which may be used for checkout stands that use a hand-held optical pen, or wand, to read digitally encoded printed material such as labels, tickets, tapes and the like. These sensing systems may be used in department stores, supermarkets, hardware stores or other retail outlets. Such hand-held optical pens provide fast checkout and the ability to read labels on oddly shaped packages. They should have the characteristics of being lightweight, durable, efficient, and inexpensive. Many of the optical pens heretofore proposed have lacked some or all of these characteristics for one reason or another. The primary hindrance to acquiring the desired characteristics lies in the optical systems utilized in the previous optical pens. As a rule, rather complicated optical systems have been employed to assure proper conveying of light from the digital code on the label to detectors employed within the optical pen. An example of a prior pen is shown in U.S. Pat. No. 3,417,234 which issued on Dec. 17, 1968 to G. E. Sundblad. This patent shows a somewhat typical prior art pen, in FIG. 1, where a lens is intermediate the ends of the pen. Additionally, hemispherical and hollow cylinders are employed at the tips of the pen in alternate embodiments, which tips are in direct contact with an optical fiber bundle. It will be noted that all the embodiments with aforementioned Sundblad patent show an integral unit which is typical of prior optical pens.

SUMMARY OF THE INVENTION

This invention relates to a hand-held optical pen which requires a minimum of optical components and also does not require any precision alignment. The basic optical components which make up the inventive device are a spherical lens, a bifurcated fiber bundle, a light source, and a light detector. This combination provides extremely high signal to noise ratios because of its high optical light collection capability. The spherical lens provides the contact surface on which the pen locates the scan spot and it images the fiber bundle onto the label. The liftoff of the focal plane with tilting of the pen is one-half to one-third less for the spherical contact surface when compared to a conical type contact surface. Additionally, the lens is located in a removable tip which may be readily replaced when damaged.

For a complete appreciation of the invention, attention is directed to the drawing and detailed description, the scope of the invention being characterized by the accompanying claims.

DESCRIPTION OF THE PREFERRED EMBODIMENT

Figures 1, 2, 3:
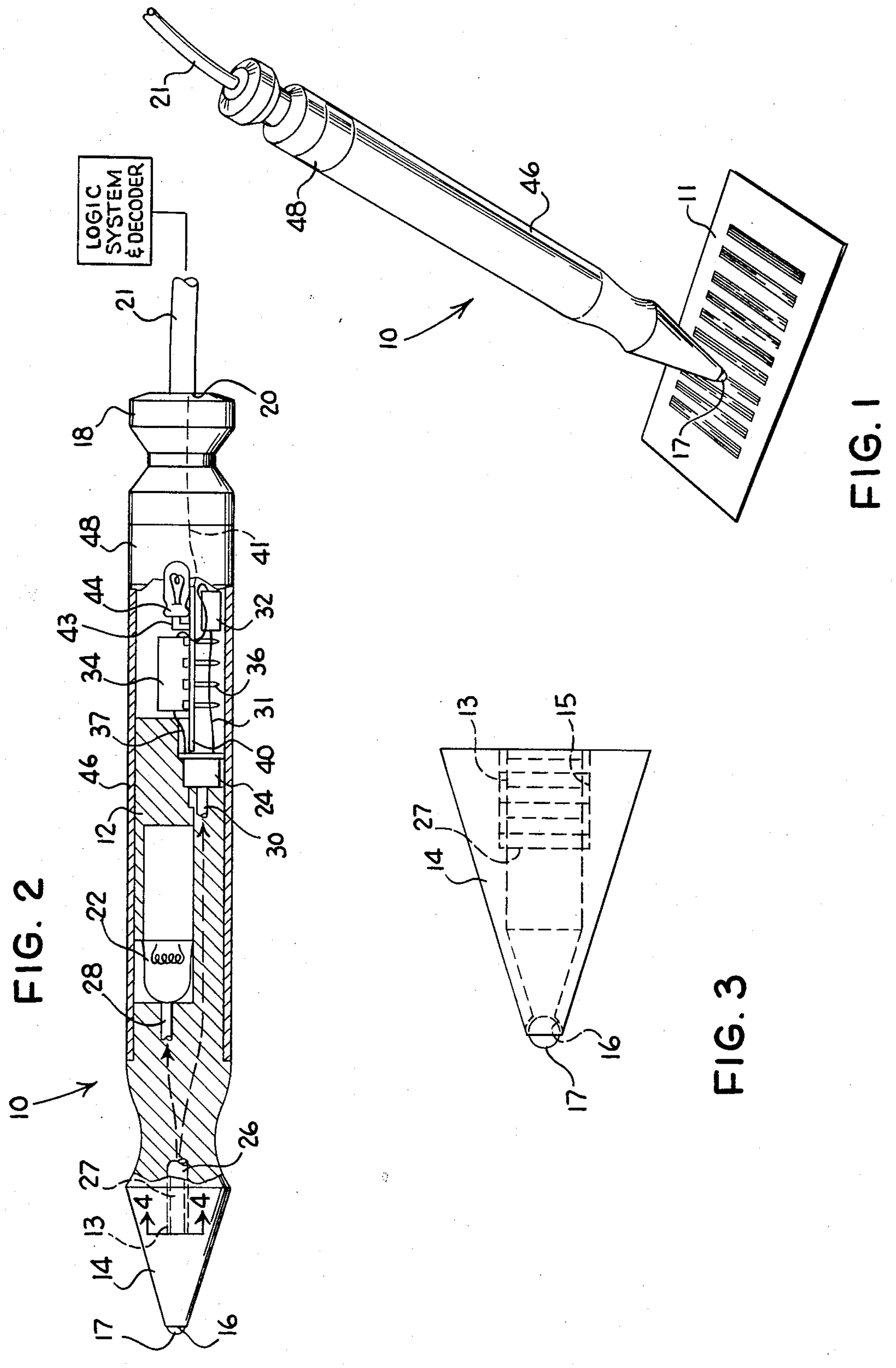
FIG. 1 is a perspective view of an optical pen utilizing the principles of this invention shown as it is used to read encoded printed material.
FIG. 2 is an elongated, cross-sectional view of the pen shown in FIG. 1 with a part of the system being shown schematically.
FIG. 3 is a cross-sectional, enlarged detailed view of the tip of the pen shown in FIG. 2.

Referring now to the figures of the drawing, an optical pen is shown generally at 10 in position to scan a label 11. The pen 10 has a longitudinally extending support member 12 which has a threaded neck 13 at one end thereof. A conically shaped tip 14, having an internally threaded opening 15 is attached to the support member 12 by being screwed onto the neck 13 into flush engagement with the support member. The tip 14 has an opening 16 at its apex in the shape of a hemispherically seat that is adapted to rotatably receive a spherical lens 17. The hemispherical shape of the opening 16 also serves as an optical stop to selectively limit light rays. The conically shaped tip 14 is so constructed that the spherical ball 17 may be forced fit in the hemispherical opening 16 and be retained thereby. The second, or opposite end 18 of the optical pen 10 is formed into a generally blunt section having an opening 20 therein. Received within the opening 20 is a cable 21.

Figure 4:
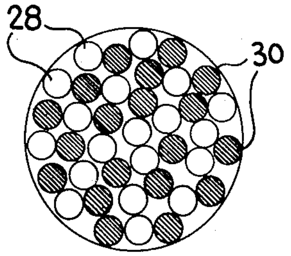
FIG. 4 is a cross-sectional view of the bifurcated fiber bundle of the pen taken along the line 4—4 of FIG. 2.

Secured to the support member 12 is a lamp assembly 22 which is positioned to direct light longitudinally towards the tip 14. The specific light source is determined by the reading requirements established for the optical pen 10. Acceptable sources would be a tungsten lamp (white light reading), a neon lamp (red light reading), or an argon lamp (blue light reading). A photosensitive detector 24 is also secured to the support member 12 at a location proximate to the lamp assembly 22. A bifurcated fiber bundle 26 is secured to the support member 12 intermediate the top 14 and the light assembly 22 and detector 24. The bundle 26 terminates with a common end 27 within the neck 13 and has one branch of light source fibers 28 that terminates immediately in front of the light assembly 22 and a second branch of photosensitive detector fibers 30 that extends to the photosensitive detector 24. As can be seen in FIG. 4, the common end has both light source fibers 28 and photosensitive detector fibers 30 randomly dispersed in substantially equal numbers. It will be noted that the common end of the bundle 26 is spaced relative to the spherical lens 17 and has no connection or contact with the removable tip 14.

A signal generated by the detector 24 is fed through a conductor 31 to a condenser 32, which acts as a toner for the signal, then through conductor 33 to an amplifier 34. A plurality of resistors 36 are connected to the amplifier 34 through a conductor 37, and the resistors are supported by a board 40 secured to the support member 12. The signal is then sent through a conductor 41 to a logic system and decoder 42 which will then translate the information supplied by the pen 10. The conductor 41 is housed within the cable 21 which is received within the opening 20. Secured to the board 40 is a second lamp 44 which is connected to the decoding means by a conductor 43 which is also received within the cable 21. The lamp 44 indicates when a complete signal has been read by the logic system and decoder 42.

A cover 46 is provided for the optical pen 10 and includes a window 48 that allows the lamp 44 to be seen by the operator of the system to let him know that a scan has resulted in a complete reading and need not be repeated.

In operation, the optical pen 10 is placed at one end of the coded label 11 with the spherical lens 17 making direct contact on the label. The optical pen 10 is then moved across the label 11 and the light reflected by the code results in an encodable signal as is well known in the art. Although it is preferable to have direct contact between the label 11 and the spherical lens 17, the pen 10 may be held slightly above the label as the code is scanned. This ability to read at a slight distance permits the reading of tickets through clear plastic protective films. The lens 17 perform two functions as used in the pen. It provides the contact surface on which the pen 10 locates the scan spot plane, and it also images the fiber bundle 26 onto the label 11. The lens 17 should be made of a material which has a relatively high hardness and a high optical refractive index. A suitable material from which the spherical lens 17 may be made is sapphire. It will be noted that the spherical lens 17 is free to rotate within the opening 16. This rotation combined with the high hardness yeilds a long life for the lens 17. Additionally, the rotating lens 17 yields less wear on the label 11, which could be advantageous when repeated readings of a label is required.

The light source 22 illuminates the fibers at the source imput fiber optic branch 28. The intercepted light is conducted down these fibers 28 yielding a multiplicity of light sources at the common end 27 of the fiber optic bundle 26. Each source is very small with respect to the total fiber bundle 26 diameter. The light source fibers 28 are mixed in a random fashion with substantially an equal number of the detector fibers 30 which lead back to the detector 24.

Figure 5:
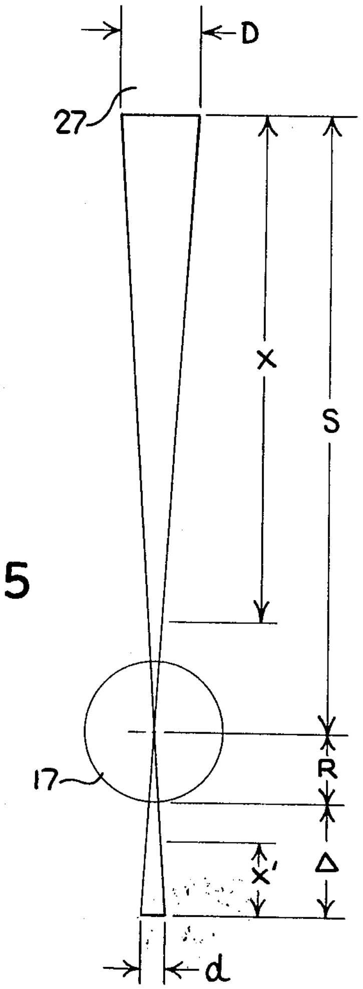
FIG. 5 is a geometric representation of the optical system of the pen shown in FIG. 1.

Both the detector fibers 30 and light emitting fibers 28 are in turn imaged by the spherical lens 17 onto a plane in front of the spherical lens. Location of this plane Δ can be computed for a sapphire lens by solving the following equation with reference to FIG. 5.

$$\Delta = 0.154R + 1.332\ R^2/X$$

Where:

$R$ = Radius of the lens 17.

$X$ = Distance from fiber optic bundle to the first focal point.

If the label 11 to be scanned is placed in the plane of focus as defined above, the light from the images of the light source fibers 28 is seen by the detector fibers 30 and conveyed to the detector 24 where it is converted into electrical signals. The mechanism for coupling the light from the source images to the detector images is basically diffraction, optical abberations and scattering within the label 11 surface.

When the label 11 surface to be scanned is not coplanar with the plane of focus, the mechanism of light coupling is somewhat different because the "images" of the fibers consist of overlapping circular areas. For this case, the detector fibers 30 view the illuminated ticket surface directly, which in turn generates a signal of the average surface reflectivity at the detector 24.

In addition to the above condition, a second condition should be met to insure proper operation of the optical pen 10. This second condition relates to the resolution capability of the optical system in all planes from the focal plane back to the surface of the spherical lens 17. The reading spot size in the plane of focus is given by the minification factor (1/M) times the fiber bundle character D. M may be calculated from the following equations:

$$M = S/(1.1154R + X^1)$$

Where:

$R$ = Radius of the spherical lens 17.

$X$ = Distance from fiber bundle to first focal point.

$$X^1 = 1.332R^2/X$$

To maintain the spot size to a reasonably constant value over the depth required, the beam diameter is limited with a suitable stop which is provided by the hemispherically shaped opening 16.

Although this invention has been described in conjunction with a portable optical pen, it is obvious that this invention may be adapted equally well to optical instruments which are fixed. For example, pens of the type described may be attached to a chart recorder where they would read moving charts while the pens remain relatively static.

I claim:

1. Apparatus for reading coded records from which light is selectively reflected, the combination comprising:

a longitudinal support means;

light means secured to said support means;

photosensitive means secured to said support means;

a removable tip secured to a first end of said support means;

a lens received at the distal end of said tip;

means for conveying light from said light means to said lens whereby a beam of light may be directed to a coded record when said lens is in optical communication therewith; and means for collecting light that is reflected from the coded record through said lens and for conveying the light to said photosensitive means.

2. The apparatus of claim 1 wherein said tip removably secured to said first end of said support means has a conical configuration whose apex has an opening within which the said lens is received.

3. The apparatus of claim 1 wherein said lens is spherical.

4. The apparatus of claim 3 wherein said spherical lens is rotatably received within said means.

5. The apparatus of claim 4 including means for conveying a signal from said photosensitive means to a logic system and decoder.

6. The apparatus of claim 5 including tubular means that receives said support means.

7. The apparatus of claim 6 wherein said opening defines a hemispherical seat operative to rotatably receive and retain said spherical lens and which serves as an optical stop.

8. Apparatus for reading coded records from which light is selectively reflected, the combination comprising:

a longitudinal support means;

light means secured to said support means and operative to direct light in a longitudinal direction toward a first end of said support means;

a tip removably secured to said first end of said support means;

a lens received within the distal end of said tip;

photosensitive means secured to said support means;

a bifurcated optical fiber bundle having a common end and two branches secured to said support means intermediate said light and photosensitive means and said concial end, said common end of said bifurcated optical fiber bundle being spaced relative to said lens;

one branch of said bifurcated bundle terminating at said light means and one branch terminating at said photosensitive means, and means in communcation with said photosensitive means for conveying a signal to a logic system and decoder.

9. The apparatus of claim 8 wherein said tip has a conical configuration whose apex has an opening within which said lens is received.

10. The apparatus of claim 8 wherein said lens is spherical.

11. The apparatus of claim 10 wherein said spherical lens is operative to rotate.

12. The apparatus of claim 11 including means for conveying a signal from said photosensitive means to signal receiving means removed from said portable apparatus.

13. The apparatus of claim 12 including tubular housing means that receives said support means.

14. The apparatus of claim 13 where said first end of said support means has a conical configuration whose large end is flush with said housing and whose apex has an opening through which the spherical lens is rotatably received.

15. In an apparatus for reading records from which light is selectively reflected, the combination comprising:

a longitudinal support means;

one end of said support means having a conical configuration with an opening at the apex thereof;

a spherical lens rotatably received within said opening;

light means secured to said support means;

photosensitive means secured to said support means;

a bifurcated optical fiber bundle having a common end and two branches secured to said support means intermediate said light and photosensitive means and said conical end, said common end of said bifurcated optical fiber bundle being spaced relative to said lens;

one branch of said bifurcated bundle terminating at said light means and one branch terminating at said photosensitive means, and means in communication with said photosensitive means for conveying a signal to a logic system and decoder.

16. In an apparatus for reading records from which light is selectively reflected, the combination comprising:

a longitudinal support means;

one end of said support means having a conical configuration with an opening at the apex thereof;

a spherical lens rotatably received within said opening;

light means secured to said support means;

photosensitive means secured to said support means;

means for conveying light from said light means to said lens whereby a beam of light may be directed to a coded record when said lens is in optical communication therewith;

means for collecting light that is reflected from the coded record through said lens and for conveying the light to said photosensitive means; and means in communication with said photosensitive means for conveying a signal to a logic system and decoder.

17. Apparatus for reading coded records from which light is selectively reflected, the combination comprising:

a support means;

light means secured to said support means;

a tip secured to a first end of said support means;

a spherical lens rotatably received at the distal end of said tip;

means for conveying light from said light means to said lens whereby a beam of light may be directed to a coded record when said lens is in optical communication therewith; and means for collecting light that is reflected from the coded record through said lens and for conveying the light to said photosensitive means.

18. Apparatus for reading coded records from which light is selectively reflected, the combination comprising;

a support means;

light means secured to said support means;

photosensitive means secured to said support means;

a spherical lens rotatably received by said support means and having a portion extending from said support means;

means for conveying light from said light means to said lens whereby a beam of light may be directed to a coded record when said lens is in optical communication therewith; and means for collecting light that is reflected from the coded record through said lens and for conveying the light to said photosensitive means.

* * * * *